United States Patent
Gahinet et al.

(10) Patent No.: US 7,647,213 B1
(45) Date of Patent: Jan. 12, 2010

(54) METHOD FOR MODELING AND ANALYZING LINEAR TIME INVARIANT SYSTEMS WITH TIME DELAYS

(75) Inventors: Pascal Gahinet, Hopkinton, MA (US); Lawrence F. Shampine, Richardson, TX (US)

(73) Assignee: The MathWorks, Inc., Natick, MA (US)

( * ) Notice: Subject to any disclaimer, the term of this patent is extended or adjusted under 35 U.S.C. 154(b) by 318 days.

(21) Appl. No.: 10/957,120

(22) Filed: Sep. 30, 2004

Related U.S. Application Data

(60) Provisional application No. 60/508,535, filed on Oct. 2, 2003.

(51) Int. Cl.
  *G06F 7/60* (2006.01)
  *G06F 17/50* (2006.01)
  *G06G 7/48* (2006.01)
(52) U.S. Cl. .................. 703/2; 703/3; 703/14
(58) Field of Classification Search .......... 703/2, 703/3, 13
  See application file for complete search history.

(56) References Cited

U.S. PATENT DOCUMENTS 6,058,258 A  5/2000  Cullum et al.
6,101,058 A *  8/2000  Morris .................. 360/69
6,188,974 B1 *  2/2001  Cullum et al. ............. 703/14
6,349,272 B1  2/2002  Phillips

OTHER PUBLICATIONS

"Improved Linear Matrix Inequality Conditions For Gain Scheduling", Gerard Scorletti, Laurent El Ghaoui. Dec. 1995 IEEE Conference on Decision and Control.*
"PECS—An Efficient Solution for Simulating Switched Networks with Nonlinear Elements", Duwang Li, Richard Tymerski. IEEE Transactions on Industrial Electronics, vol. 48, No. 2, Apr. 2001.*
"Measurement and Symbolic Analysis of Implemented Multirate Systems", Schuessler and Heinle, Sep. 1996.*
The MathWorks, Inc., "Control System Toolbox For Use with MATLAB," User's Guide Version 4.1, (1992-1998).

* cited by examiner

*Primary Examiner*—Paul L Rodriguez
*Assistant Examiner*—Nithya Janakiraman
(74) *Attorney, Agent, or Firm*—Lahive & Cockfield, LLP; Kevin J. Canning

(57) ABSTRACT

A method and apparatus are provided to model, analyze, and build linear time invariant systems with delays. The method and apparatus model a linear time invariant system as a linear fractional transformation of matrices of a delay free linear time invariant model with a bank of pure delays. The method and apparatus of the present invention can further accommodate input delays and output delays associated with the linear time invariant system with delays.

7 Claims, 4 Drawing Sheets

_US 7,647,213 B1_

METHOD FOR MODELING AND ANALYZING LINEAR TIME INVARIANT SYSTEMS WITH TIME DELAYS

RELATED APPLICATIONS

This application claims the benefit of U.S. Provisional Application No. 60/508,535; filed Oct. 2, 2003, the contents of which are hereby incorporated by reference in their entirety.

TECHNICAL FIELD OF THE INVENTION

The present invention generally relates to modeling and analysis of linear systems and, more particularly, to modeling and analysis of linear systems with delays.

BACKGROUND OF THE INVENTION

Time Delays, also known as time lags or transport delays, often arise in control processes. Long delays (relative to the dominant time constant of the process) in control processes tend to limit the performance of control systems. In contrast, short delays (relative to the dominant time constant of the process) are also common in control processes and like long delays tend to limit the performance of a control system.

Numerous attempts have been undertaken to extend classical and modern control techniques to accommodate time delays in linear systems. However, the results of these efforts offer limited support for linear systems with delays. Moreover, those solutions capable of handling delay differential equations (DDEs) are considered restrictive and burdensome for use to design control systems because they do not work well with standard linear analysis tools such as the Control System Toolbox available from The MathWorks®, of Natick, Mass.

One known theory well suited for use in describing a control processes is linear time invariant (LTI) system theory. LTI systems form a large and useful class of systems well suited to describe, amongst others, communication channels, manufacturing systems, airplanes, and economic systems. LTI systems are dynamic systems having the following properties. First, the behavior of an LTI system does not change with time, that is, LTI systems are time invariant. Second, the input/output relationship of an LTI system is linear, that is, the system obeys the superposition principle. As such, LTI systems are often fundamental building blocks for theoretical and applied control engineering applications.

An LTI system is describable according to the following first order state space formulas:

$$\frac{dx}{dt} = Ax(t) + Bu(t) \quad \text{(Eq. 1)}$$

$$y(t) = Cx(t) + Du(t) \quad \text{(Eq. 2)}$$

The input to the LTI system u(t) and the output of the LTI system y(t) are considered vector valued signals. The state vector of the LTI system is represented by x(t). In the Laplace domain, the input/output transfer function H(s) of this LTI system is definable by the following formula:

$$H(s) = D + C(s1-A)^{-1}B \quad \text{(Eq. 3)}$$

Equations 1-3 define a class of LTI systems often used to conduct linear analysis and design of control systems and processes. Nonetheless, such classes of LTI systems provide little if any support for time delays. It is well known that time delays are common in actual systems, however, it is also common for control system modeling or analysis tools to lack a general framework for representing, manipulating, and analyzing LTI systems with delays. Consequently, it is often difficult to model, analyze, and design systems, such as control systems and processes with delays. Therefore, there exists a need for a framework for manipulating and analyzing LTI systems with delays.

SUMMARY OF THE INTENTION

The present invention addresses the above described limitation of modeling, analyzing, and designing control systems and processes with delays. The present invention provides an approach to represent LTI systems with delays in order to model, analyze, and design control systems and processes with delays. That is, the present invention provides a representation of an LTI system with delays through a linear fractional transformation (LFT) involving a delay-free, LTI model, and a bank of delays. The LFT based representation takes into account delays, such as feedback delays, input delays, and output delays associated with the LTI system. Moreover, the LFT representation provided by the present invention is well suited for use in modeling, analyzing and designing control systems and processes. Further, the representation of LTI systems with delays disclosed beneficially provides a computational friendly solution, that is, the disclosed representation is well suited for use in computer aided analysis and design of control systems and control processes in the presence of delays.

In one embodiment of the present invention, a method for modeling an LTI system is disclosed. The method includes steps of representing the LTI system as an LFT and modeling the LTI using the LFT. The method can further include a step of representing an input delay of the LTI with the LFT and a step of representing an output delay of the LTI with the LFT.

In another embodiment of the present invention, a method performed in an electronic device providing a technical computing environment is described. Performance of the method executes steps for analyzing a linear system with delays in the technical computing environment. The steps executed by the method include representing the linear system with the delay as a state based model having a delay operator and determining one or more responses of the state based model to analyze the linear system with delays.

In the step of determining one or more responses, the method can further execute a step of determining a frequency domain response of the state based model. Further, in the step of determining one or more responses, the method can execute a step of determining a time domain response of the state based model. In the step of determining a time domain response, the method can further perform a number of additional steps. Such steps include identifying a number of changes in a signal of the state based model associated with a delay channel of the model and determining a change of magnitude for each of the changes. A further step performed by the method when determining a time domain response includes determining an area between each successive change identified in the number of changes in the signal.

The method is further capable of executing additional steps when determining a time domain response of the state based model. Those additional steps include a step of identifying select changes in the signal and a step of determining a value of the signal from the selected changes in the signal.

BRIEF DESCRIPTION OF THE DRAWINGS

An illustrative embodiment of the present invention will be described below relative to the following drawings.

DETAILED DESCRIPTION

Figure 1:
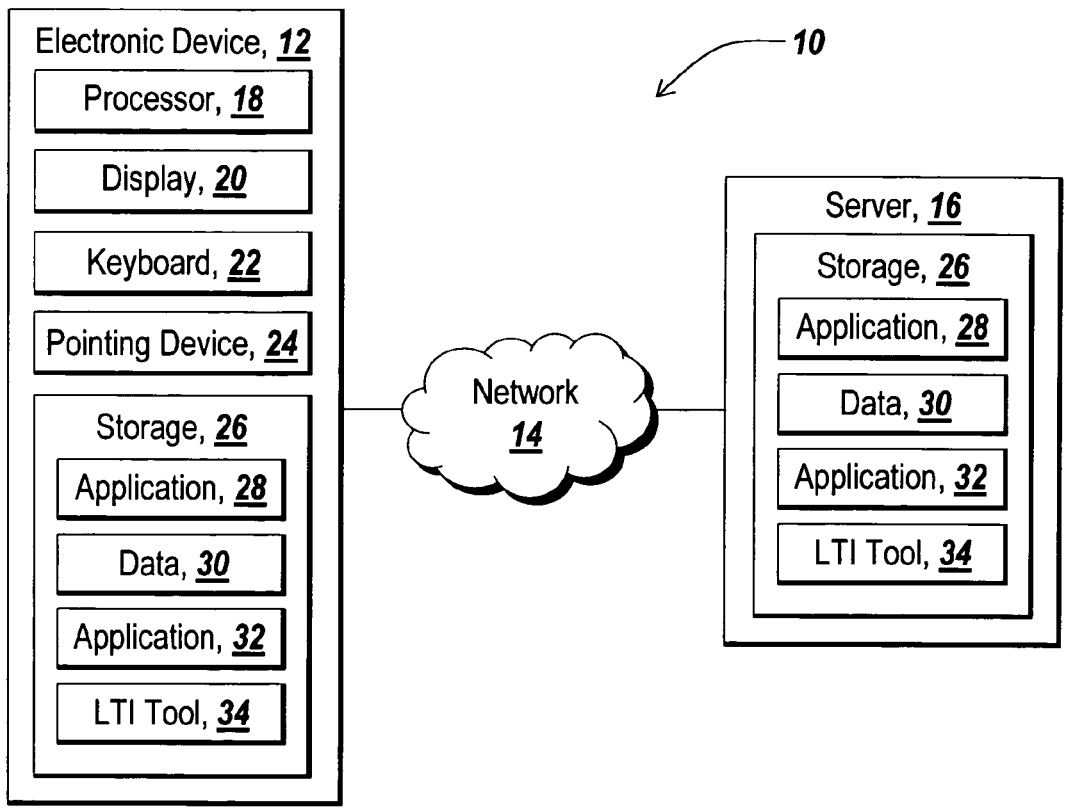
FIG. 1 is an exemplary block diagram illustrating an environment suitable for practicing the illustrative embodiment of the present invention.

The illustrative embodiment of the present invention provides a method and apparatus for modeling, analyzing, and designing control systems and processes using LTI systems with time delays. The illustrative embodiment represents a control system or processes with input delays, output delays, and feedback delays with a state based representation. The illustrative embodiment of the present invention advantageously extends the class of delay free LTI systems to incorporate time delays while preserving the computational friendly nature of LTI systems. That is, the extended class of LTI systems disclosed by the present invention are well suited for use in computer aided analysis and design of control processes having delays.

The extended class of LTI systems disclosed by the present invention is referred to herein as a generalized linear time invariant (GLTI) model representation. The GLTI model representation of the present invention provides several beneficial properties. First, a GLTI model representation defines a closed system in a graphical modeling environment. That is, any class of LTI systems represented by a GLTI model representation is a closed system under series, parallel and feedback connections as well as branching junctions and summing junctions in any graphical representation interconnection of GLTI model representations. Second, a GLTI model representation provides that any linearization of any non-linear graphical model with time delays in a graphical modeling environment is a GLTI model representation. Consequently, these two properties illustrate that the GLTI model representation disclosed by the present invention is general enough to model nearly any linearized system with a finite number of delays, including delays in a feedback path. Further, the GLTI model representation of the present invention supports delay differential algebraic equation (DDAE) solvers that efficiently and accurately simulate the time response of a GLTI model representation of an LTI system with delays. Furthermore, frequency domain analysis of an LTI system with delays is achievable with a GLTI model representation of that system.

A significant number of classical analysis and design techniques for control systems and processes readily extend to a GLTI model representation of the present invention. That is, the GLTI model representation of the present invention is extensible to allow existing computer aided design and control (CACSD) applications to adapt a representation of the GLTI model representation of the present invention to analyze, model, or design a control system or process. This facilitates computer aided control system design to enable analysis of control systems and control processes with delays within a CACSD environment. One such suitable CACSD environment is MATLAB® available from MathWorks, Inc. of Natick, Mass. Moreover, a GLTI model representation in accordance with the illustrative embodiments of the present invention is applicable to both continuous and discrete time LTI systems.

FIG. 1 illustrates an environment suitable for practicing an illustrative embodiment of the present invention. A computer system 10 includes an electronic device 12, a network 14, such as the Internet or an intranet, or other suitable network either wired, wireless or a hybrid of wired and wireless, and optionally, a server 16 or other networkable device. The electronic device 12 includes a microprocessor 18 for executing various instructions and programs, and controlling various hardware and software components, a display device 20 for use in rendering textual and graphical images. The electronic device 12 further includes a storage device 26 for storing various items, such as a first application 28, a second application 32, data 30, and a linear time invariant modeling (LTI) tool 34. Storage device 26 is capable of storing other various items, such as other data, information, and programs. The electronic device 12 also includes a keyboard 22 and a pointing device 24, such as a mouse, trackball, or light pen. Those skilled in the art will appreciate that LTI tool 34 is adaptable to be included as part of the first application 28, or as part of the second application 32. Alternatively, LTI tool 34 can be a stand alone application that responds to calls from the first application 28 or the second application 32.

For illustrative purposes, the first application 28 is discussed below in terms of MATLAB® from MathWorks, Inc. of Natick, Mass. Further, for illustrative purposes the second application 32 is discussed below in terms of SIMULINK® from MathWorks, Inc. of Natick, Mass. Those skilled in the art will appreciate that the first application 28 can be another CACSD environment and the second application 32 can be another graphical programming environment or block diagram modeling environment. Those skilled in the art will appreciate that the principles and concepts described below are equally applicable to other graphical modeling environments, such as Lab View, System View, Signal Processing Workstation, Hyper Signal, COSSAP, Angeles, PTOMLEMY, and other like graphical modeling environments and block diagram tools. Furthermore, those skilled in the art will appreciate that other suitable CACSD environments include, but are not limited to Math, Mathematica, Scilab, and Octave.

Those skilled in the art will also recognize that electronic device 12 includes other software such as various user interfaces and other programs, such as one or more OS program, compilers and various other program applications developed in a variety of programming environments for controlling system software and hardware components.

The server 16 coupled to network 14 is adaptable to include first application 28', second application 32', data 30', and LTI tool 34' held by storage device 26'. In this manner, any number of users are able to access the first application 28', the second application 32', data 30', and the LTI tool 34' via network 14 without the need to have each user running a local copy of one or all of the applications, tools, or data held by storage device 26.

The illustrative embodiment of the present invention provides a novel framework for representing, manipulating, and analyzing LTI systems with delays. This novel framework allows state based Equations 1 and 2 to accommodate time delays. This new representation of state based equations is referred to herein as GLTI model representations. GLTI model representations of the present invention are an extension to the class of LTI systems whose transfer function is in the form of Equations 4 and 5 below:

$$H(s, \tau) = \Gamma\left(\underbrace{\begin{bmatrix} H_{11}(s) & H_{12}(s) \\ H_{21}(s) & H_{22}(s) \end{bmatrix}}_{H(s)}, \theta(s, \tau)\right) \quad \text{(Eq. 4)}$$

$$H(s,\tau) = H_{11}(s) + H_{12}(s)(\theta(s,\tau)^{-1} - H_{22}(s))^{-1} H_{21}(s) \quad \text{(Eq. 5)}$$

In Equations 4 and 5, H(s) is a rational transfer function, $\theta(s,\tau) = \text{diag}(\exp(-\tau_1 s), \ldots, \exp(-\tau_N s))$ is the transfer function of a bank of scalar, nonnegative delays $\tau_1, \ldots, \tau_N$ called the "internal" delays, and $\Gamma(H,\theta)$ is a standard linear fractional transformation (LFT) of matrices. In other words, GLTI model representations of the present invention are LTI systems capable of being modeled as an LFT interconnection of a delay free LTI model H(s) with a bank of pure delays.

Figure 2:
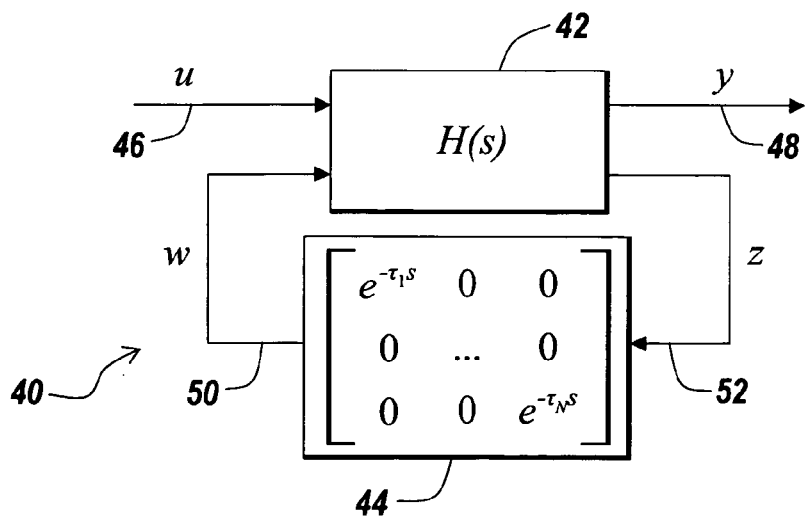
FIG. 2 is a block diagram of a generalized linear time invariant system suitable for practicing the illustrative embodiment of the present invention.

FIG. 2 illustrates a GLTI model representation of an LTI system with delays suitable for practicing the illustrative embodiment of the present invention. The GLTI model representation 40 includes a delay rational transfer function H(s) 42 coupled to a feedback loop with a bank of pure time delays 44. The rational transfer function H(s) 42 further includes an input 46 and an output 48. The bank of pure time delays 44 includes an input 52 coupled to the rational transfer function H(s) 42 and an output 50 which provides a second input to the rational transfer function H(s). GLTI model representation 40 represents a continuous time GLTI system. Consequently, GLTI model representation 40 is well suited to model nearly any linearized system with a finite number of delays, including delays in the feedback path.

Figure 3:
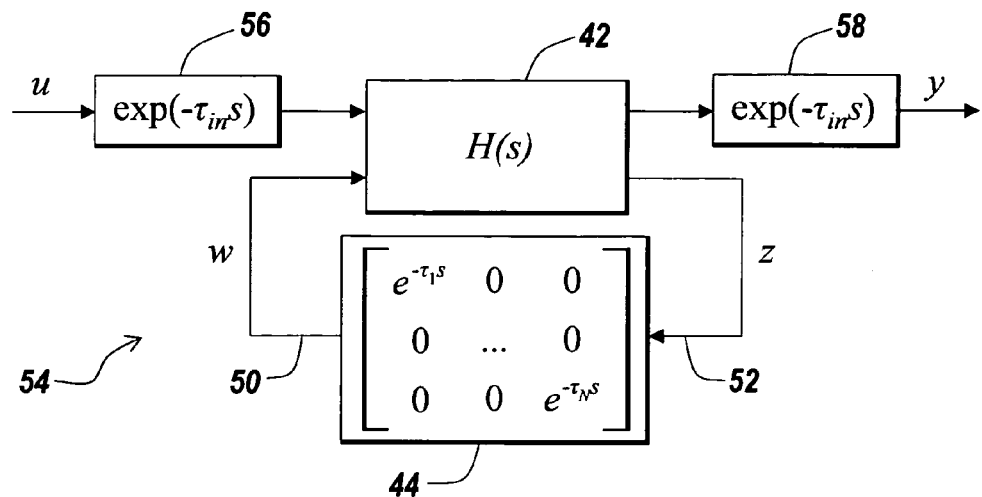
FIG. 3 illustrates a further generalized linear time invariant system having an input delay, an output delay, and a feedback delay suitable for practicing the illustrative embodiment of the present invention.

FIG. 3 illustrates the GLTI model representation 40 of a LTI system represented with additional delays corresponding to system input delays and system output delays solely. The GLTI model representation 54 includes the rational transfer function H(s) 42 coupled to the bank of pure time delays 44 and further includes input delay 56 and output delay 58.

A counterpart of the continuous time GLTI model representations illustrated in FIGS. 2 and 3 include a discrete time GLTI model representation defined as all discrete time LTI systems whose transfer function is of the form in Equation 6 below:

$$H(z, \delta) = \Gamma\left(\begin{bmatrix} H_{11}(z) & H_{12}(z) \\ H_{21}(z) & H_{22}(z) \end{bmatrix}, \theta(z, \delta)\right) \quad \text{(Eq. 6)}$$

where $\theta(z,\delta) = \text{diag}(z^{\delta_1}, \ldots, z^{\delta_N})$ represents a collection of discrete-time delays, all integer multiple of the sampling period. While H(z,δ) is a rational transfer function well suited for analysis with available LTI tools, its order can grow large when the delays are long when compared to a sampling period. The GLTI model representation of LTI systems with delays illustrated in FIGS. 2 and 3 provide an attractive alternative in such cases, because the GLTI model representation provides the ability to separate delays from the model dynamics H(z). Those skilled in the art will appreciate that the GLTI model representations illustrated in FIGS. 2 and 3 are well suited to represent hybrid linear systems with a mix of continuous and discrete time states and delays.

Those skilled in the art will also recognize that the state space representation of delay free LTI models defined by Equations 1 and 2 is an important tool for numerical manipulation and analysis of LTI systems. Computations with state based models tend to be more efficient and more stable numerically then with other representations such as, transfer function and zero pole gain.

Using the state-space representations of delay free LTI models defined in Equations 1 and 2 a GLTI model representation of the illustrative embodiment of the present invention is derived therefrom. By introducing a state space realization of the delay free portion H(s) in Equation 4:

$$H(s) := \begin{bmatrix} H_{11}(s) & H_{12}(s) \\ H_{21}(s) & H_{22}(s) \end{bmatrix} = \begin{bmatrix} D_{11} & D_{12} \\ D_{21} & D_{22} \end{bmatrix} + \begin{bmatrix} C_1 \\ C_2 \end{bmatrix} (sI - A)^{-1} [B_1 \ B_2] \quad \text{(Eq. 7)}$$

straightforward calculations show that state space equations for a GLTI model representation H(s, τ) in accordance with the illustrative embodiment of the present invention are given by Equations 8-1:

$$\frac{dx}{dt} = Ax(t) + B_1 u(t) + B_2 w(t) \quad \text{(Eq. 8)}$$

$$y(t) = C_1 x(t) + D_{11} u(t) + D_{12} w(t) \quad \text{(Eq. 9)}$$

$$z(t) = C_2 x(t) + D_{21} u(t) + D_{22} w(t) \quad \text{(Eq. 10)}$$

$$w = (\Delta_\tau z)(t) \quad \text{(Eq. 11)}$$

where, $\Delta_\tau$ is the multi-delay operator defined by Equation 12:

$$(\Delta_\tau z)(t) = [z_j(t - \tau_j)]_{j=1,\ldots,N} \quad \text{(Eq. 12)}$$

u(t) and y(t) are external (vector-valued) input and output signals, and w(t) and z(t) are commensurate vector-valued signals associated with internal delay channels. Thus, a GLTI model representation of the present invention is defined by Equations 8-12.

The class of LTI systems represented by the GLTI model representations of the present invention has a number of significant advantages that benefit CACSD environments. That is, the GLTI model representations of the present invention include the set of LTI models represented by Equations 1 and 2. Further, many GLTI model representations are considered closed under graphical modeling interconnections regardless of whether the interconnection is a series interconnection, a parallel interconnection, a feedback interconnection, a branching junction, or a summing junction. More specifically, given two GLTI model representations in accordance with the present invention having state vectors $x_1$ and $x_2$, delay vectors $\tau_1$ and $\tau_2$, standard state space manipulations reveal that any series, parallel, or feedback interconnections of two GLTI model representations constitutes another GLTI model representation with state vector $$x = \begin{bmatrix} x_1 \\ x_2 \end{bmatrix}$$

and delay vector $$\tau = \begin{bmatrix} \tau_1 \\ \tau_2 \end{bmatrix}.$$

Accordingly, delays in the GLTI model representations of the present invention, like states in conventional state space models, are accumulated through interconnections between such GLTI model representations in graphical modeling environments.

Moreover, pure time delays $d(s)=\exp(-\zeta s)$ are a member of the GLTI model representations of the present invention since these pure time delays correspond to the case $$H(s) = \begin{bmatrix} 0 & 1 \\ 1 & 0 \end{bmatrix}$$

and $\tau=\zeta$. As a result, the pure time delays in combination with closure under interconnection in a graphical modeling environment helps insure that a GLTI model representation in accordance with the present invention can contain all or nearly all LTI systems with delays, including plant models with input or output delays, feedback loops with measurement delays, and so on.

Those skilled in the art will appreciate that a GLTI model representation as discussed herein can include all state based models of the form defined in Equations 13 and 14 below:

$$\frac{dx}{dt} = Ax(t) + \sum_{j=0}^{r} A_j x(t-\tau_j) + Bu(t) + \sum_{j=0}^{r} B_j u(t-\tau_j) \quad \text{(Eq. 13)}$$

$$y = Cx(t) + \sum_{j=0}^{r} C_j x(t-\tau_j) + Du(t) + \sum_{j=0}^{r} D_j u(t-\tau_j)) \quad \text{(Eq. 14)}$$

So the GLTI representation also facilitates the description and manipulation of systems described by Equations 13 and 14 with CACSD environments that provide linear analysis and linear design capabilities. More specifically, the GLTI model representations illustrated in FIGS. 2 and 3 facilitate the extension of conventional state space models often available CACSD environments in order to model, analyze, and design LTI systems with delays.

The GLTI model representations of the present invention are well suited for use in conducting time and frequency response evaluations of LTI systems with delays. Computing the frequency response of a GLTI model representation disclosed herein can be accomplished by using a transfer function expression represented as:

$$H(s,\tau)=\Gamma(H(s),\theta(s,\tau)) \quad \text{(Eq. 15)}$$

As such, at each frequency point s, H(s) and $\theta(s,\tau)$ are evaluated separately and the GLTI model representation response $H(s,\tau)$ is obtained by combing H(s) and $\theta(s,\tau)$ according to the LFT formula in the Equation below:

$$\Gamma\left(\begin{bmatrix} M_{11} & M_{12} \\ M_{21} & M_{22} \end{bmatrix}, \theta\right) = M_{11} + M_{12}(\theta^{-1} - M_{22})^{-1} M_{21} \quad \text{(Eq. 16)}$$

Computation of time domain responses of a GLTI model representation in accordance with the illustrative embodiments of the present invention, for example, a step response, employs specialized solvers to simulate a time domain response. Equations 8, 10 and 11 form a system of delay differential algebraic equations (DDAEs). One approach to integrating Equation 8, 10 and 11 consists of using a conventional variable step ordinary differential equation (ODE) solver together with finite length buffers to keep track of the task values of z(t) needed to evaluate w(t). Should the ODE solver compute as a solution on [0, tn], values of z(t) are obtained by interpolation for $t \leq t_n$, and by zero order hold extrapolation for $t > t_n$. This approach works well on solving a number of problems, however, it provides no guarantee when taking steps longer than the smallest delay due to the ad hoc nature of the z extrapolation scheme. Accordingly, solvers suitable for GLTI model representations of the illustrated embodiment of the present invention are discussed below.

A set of DDEs suitable for use with the present invention is obtainable by differentiating the algebraic equation for z(t) defined in Equation 10. In the parlance of differential algebraic equations (DAEs), differentiating the algebraic equation for z(t) shows the problem is of index 1. In the parlance of DDEs, differentiating the algebraic equation for z(t) shows that the equations of the set are of neutral type because the equation for z'(t) involves z' itself with delayed arguments (here z' denotes the first derivative of z). As such, computing the response of a GLTI model representation to a step input u(t), the discontinuity at t=0 generally introduces a jump in z and x' at that location. It is characteristic of DDEs of neutral type that the delays cause these jumps to propagate to all times $$\sum_{i=1}^{N} m_i \tau_i$$

where $m_i$ are non negative integers. Conventionally, numerical methods do not have a predictable behavior when straddling a jump discontinuity, accordingly the present invention tracks such discontinuities and applies a method disclosed below where the solution is smooth in order to compute time domain responses. In the alternative, a numerical method as described below provides a solution that is piece wise smooth to compute time domain responses.

The algebraic variables z(t) appear in a desirable manner, accordingly, solving Equations 8-11 have more in common with a DDE solver than a DAE solver. Many conventional DDE solvers restrict the step size to the length of the shortest delay because an explicit formula for ODEs can than be used. Unfortunately, the GLTI model representation of the present invention can neither use an explicit method nor is it considered beneficial to accept such a restriction. Acceptance of such a restriction is not practical because small delays are often common in control processes, these delays being small enough that simulation is impractical with such a restriction. Consequently, the illustrative embodiment of the present invention takes a step longer than the shortest delay, and hence, the numerical solution is defined implicitly even when the formula itself is explicit. By evaluating the numerical solution iteratively in this situation, it becomes practical to simulate systems with short delays. When solving DDEs associated with the GLTI model representations of the present invention it is beneficial to use the implicit methodology to evaluate delay terms.

The Radau IIa two-stage implicit Runge-Kutta formula is a one-step method that is L-stable and of order three (3) suited for use with the present invention to evaluate delay terms of a GLTI model representation. A one-step method facilitates the handling of propagated discontinuities. The stability of the one-step method is well suited for use with a GLTI model representation and the order three (3) works well in a simulation environment. Because the DDAEs are linear and the matrices are constant, it is possible to evaluate this implicit method in an efficient manner by solving a system of linear equations. When solving DDEs it is beneficial to approximate the solution everywhere in order to evaluate delayed terms. A cubic Hermite polynomial interpolant to the values of x and x' at both ends of a step provides an accurate approximation over the span of the step. The algebraic variables are less smooth, and to account for this formation of a cubic polynomial interpolant to the values of z at the ends of the step and two interior points takes place.

DDEs of neutral type can be exceedingly difficult to solve because of propagated discontinuities. Conventional applications for solving DDEs of neutral type often track discontinuities, but such conventional applications have at least the option of not tracking discontinuities. Tracking discontinuities in accordance with the present invention means locating the jumps in z(t), integrating the smooth solution between successive jumps, and computing the sizes of the jump. Because there can be a significant number of jumps, at times it becomes impractical to track them all. Consequently, a selected number of jumps, for example the first one hundred jumps are tracked and thereafter the GLTI model representation approximates z(t) by a continuous function. Those skilled in the art will appreciate that this methodology works particularly well for a stable GLTI model representation because it is likely that the sizes of jumps decay as a simulation proceeds.

After the DDAE solver stops tracking discontinuities, it integrates equations whose solution is only piecewise smooth. The residual of a numerical solution is the amount by which it fails to satisfy the equations. Because the DDAE solver determines a piecewise cubic polynomial solution, it allows a user of the electronic device 12 to evaluate the residual wherever they choose. The ability to determine a piecewise cubic polynomial solution allows the DDAE solver of the present invention to estimate and control the size of the residual at each step. A reliable measure of size when the residual may be piecewise smooth is obtained by using an integral norm and a quadrature rule of order eight (8).

The illustrative embodiments of the present invention advantageously exploit a special form of DDAEs that describe GLTI model representations in a graphical modeling-environment. This facilitates such GLTI model representations to simulate the step response of an LTI system with delay. Moreover, the computational performance provided by these specialized DDAEs is comparable to that of available delay-free state-space models. As such, the GLTI model representations are well suited for simulating the response to arbitrary input signals.

Equations 8-11 provide a state space representation well suited for computer aided manipulation of GLTI systems in accordance with the illustrative embodiments of the present invention. A significant feature of Equations 8-11 is the ability to facilitate the extension of available delay-free state-space models to accommodate the state space representation of a GLTI model representation in accordance with the illustrative embodiment of the present invention. That is, Equations 8-11 are capable of being adapted to integrate with existing data structures for state space models without the need for new, more complex data structures and interfaces. This contrasts with the following less general representation of LTI models with delays:

$$\frac{dx}{dt} = Ax(t) + \sum_{j=0}^{r} A_j x(t-\tau_j) + Bu(t) + \sum_{j=0}^{r} B_j u(t-\tau_j) \quad \text{(Eq. 13)}$$

$$y = Cx(t) + \sum_{j=0}^{r} C_j x(t-\tau_j) + Du(t) + \sum_{j=0}^{r} D_j u(t-\tau_j)) \quad \text{(Eq. 14)}$$

which are awkward and burdensome to manipulate because basic interconnection operations tend to exponentially grow the list of delays $\tau_j$ and thus rapidly increase the associated memory requirements and computational burden.

One example of a data structure and interface suitable for integration with state spaced Equations 8-11 is available in the MATLAB® control system toolbox. This toolbox includes a state-space (SS) object. The SS object represents and manipulates delay free state space models in the MATLAB® environment. The SS object is extensible to represent state space GLTI model representations in the MATLAB® environment. The SS object stores four matrices labeled A, B, C, and D of a state space model into four separate properties a, b, c, and d, respectively. To accommodate state space representation of a GLTI model representation, the data structure of the SS object is configurable to store the vector of internal delays $\tau_1, \ldots, \tau_N$ into an additional property and to store the matrices $$A, B = [B_1 \quad B_2], C = \begin{bmatrix} C_1 \\ C_2 \end{bmatrix}, D = \begin{bmatrix} D_{11} & D_{12} \\ D_{21} & D_{22} \end{bmatrix}$$

into the properties a, b, c, and d, respectively. Even with this extension, the SS object remains compatible with delay free LTI models where $B_2=C_2=D_{22}$ which equals [ ]. The display method of the SS object hides any additional delay related I/O channels by displaying only the nominal values of A, B, C, and D, corresponding to all delays set to zero along with the list of internal delay values. Other similar extensions are developable for transfer function models.

Consequently, with such a data structure for GLTI model representations, conventional commands for manipulating and analyzing LTI systems are extensible to handle GLTI systems. Such commands include, for example, interconnection commands such as series, parallel, feedback, as well as related arithmetic operators. Other examples extendible to handle GLTI model representations include functions for computing and plotting time and frequency responses, and functions for computing stability margins, bandwidth, and other performance assessment criteria. It is likely that no new syntax is required for any of these commands, thus facilitating the extension of certain conventional modeling tools to model LTI systems with delays using GLTI model representations of the present invention.

Figure 4:
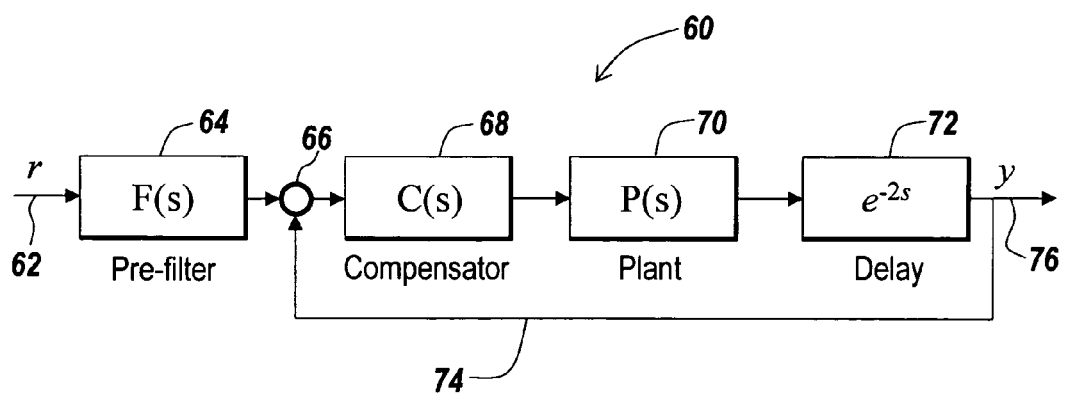
FIG. 4 illustrates an exemplary control system suitable for modeling and analyzing in accordance with the illustrative embodiment of the present invention.

FIG. 4 illustrates an exemplary control system suitable for modeling with a GLTI model representation of the present invention Control system 60 includes a pre-filter block 64, a combiner node 66, a compensator block 68, a plant 70, and a delay block 72. The pre-filter block 64 receives an input signal 62 and processes the signal in accordance with Equation 17 to assert an output signal to combiner node 66.

$$F(s) = \frac{s^2 + 0.25s + 0.2}{s^2 + 0.9s + 0.2} \quad \text{(Eq. 17)}$$

Combiner node 66 also receives an input from feedback loop 74. Feedback loop 74 includes delays. Combiner node 66 combines the output from the pre-filter block 64 and the feedback signal from feedback loop 74 and provides an input to the compensator block 68. Compensator block 68 processes the input from the combiner node 66 in accordance with Equation 18 and in turn asserts an output signal to the plant block 70.

$$C(s) = \frac{1}{s(s + 3.4)} \quad \text{(Eq. 18)}$$

Plant block 76 processes the signal from the compensator block 68 according to Equation 19 and in turn asserts an output signal to the delay block 72.

$$P(s) = \frac{1}{s + 1} \quad \text{(Eq. 19)}$$

Delay block 72 processes the signal from the plant block 70 according to Equation 20 and asserts output signal 76, which is fed back into combiner node 66 and asserted on output node "y".

$$e^{-2s} \quad \text{(Eq. 20)}$$

As such, the commands for building a GLTI model representation of this feedback group in the MATLAB® environment are as follows:
% Define each component
P=tf(1, [1 1], 'outputdelay', 2)
C=tf(1, [1 3.4 0])
F=tf([1 0.25 0.2], [1 0.9 0.2])
% Connect components
H=F*feedback(ss(C*P), 1)

The closed-loop step response and Bode diagrams can then be plotted by:
 step(H); and
 bode(H).

Figure 5:
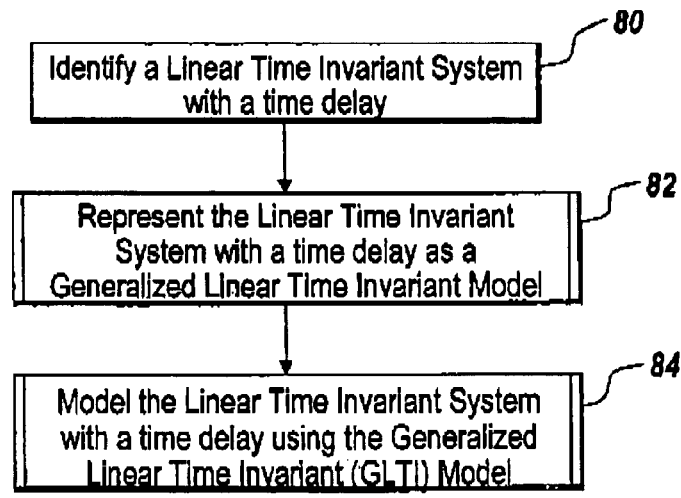
FIG. 5 is an exemplary flowchart that provides an overview of steps taken to practice the illustrative embodiment of the present invention.
Figure 6:
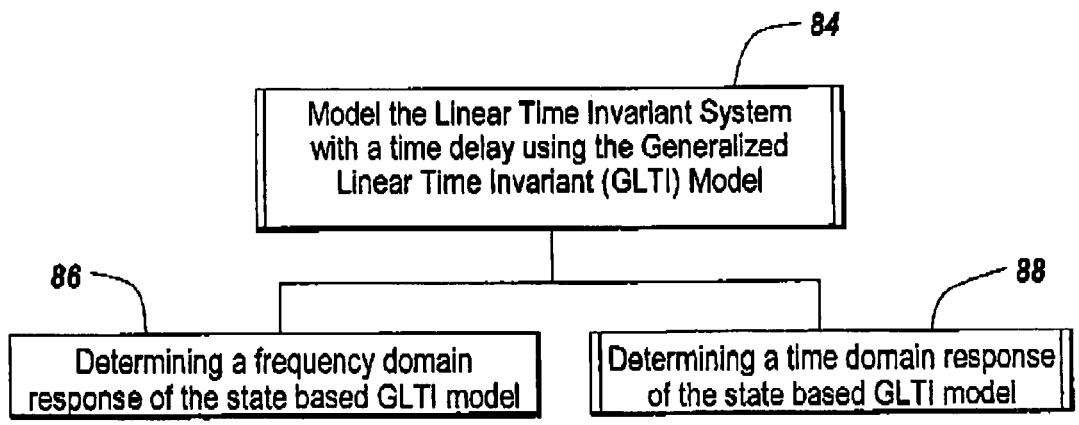
FIG. 6 is an exemplary flowchart that provides an overview of steps taken to practice a further illustrative embodiment of the present invention.
Figure 7:
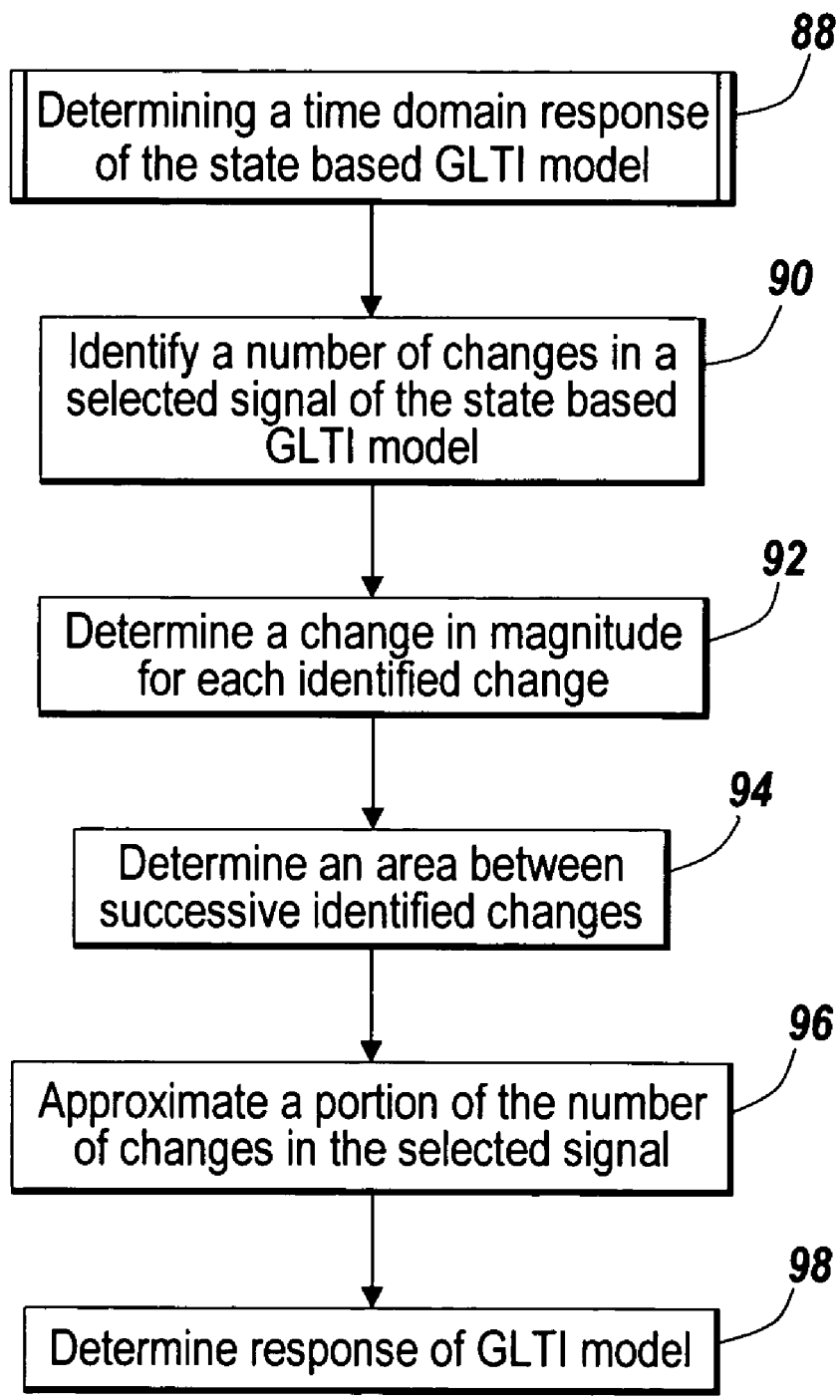
FIG. 7 is a more detailed flowchart of the flowchart illustrated in FIG. 6.

FIGS. 5-7 depict steps taken to model or analyze a LTI system with delays in accordance with an illustrative embodiment of the present invention. In step 80, an LTI system with a time delay is identified. In step 82, the LTI system with the time delay is represented as a LFT or GLTI model representation 40. In step 84, the GLTI model representation 40 is used to model or analyze the identified LTI system with the delay.

In step 84, the modeling of the GLTI model representation 40 of the LTI system with the delay can compute either a frequency domain response of the GLTI model representation or compute a time demand response of the GLTI model representation. In step 86, a frequency domain response of the LTI system with delays is determined using the GLTI model representation. The frequency domain response of the GLTI model representation can be accomplished using the transfer function expressed in Equation 15. At each frequency point s, H(s), and θ(s, τ) are evaluated separately and the GLTI model representation response H(s, τ) is obtained by combining H(s) and θ(s, τ) according to the LFT formula in Equation 16.

In step 88, a time domain response of the GLTI model representation proceeds to step 90, where a number of changes in a selected signal of the GLTI model representation is identified. In step 92, a change in magnitude for each identified change in the selected signal is determined. In step 94, an area between successive identified changes is determined. In step 96, a portion of the number of changes in the selected signal is approximated. The approximation takes place about after the first one hundred identified changes in the selected signal. Thereafter, in step 98, the time domain response of the GLTI model representation is determined from the approximation and from the areas between successive identified changes.

Those skilled in the art will appreciate that the present invention is well suited to construct LTI models describing linearized dynamics of systems with delays. The present invention further provides the ability to incrementally build linearized models of complex control systems with delays. These benefits are achieved by either building GLTI model representations of individual components and then connecting the GLTI model representations together or by performing block based linearization of a non-linear block diagram provided in a graphical modeling environment, such as a graphical modeling environment provided by second application 32. Both approaches are well suited to track delays. Moreover, the present invention provides the capability to simulate the time and frequency responses of LTI systems with delay and further provides the capability to analyze the performance of control systems and control processes with delays using a variety of linear analysis techniques, such as frequency response, stability margins, robustness analysis, and so on.

Those skilled in the art will further recognize that the present invention avoids the need to conduct PADE approximations or other approximate techniques to account for delays in feedback paths or in modeling LTI systems with delays. The GLTI model representations of the present invention are well suited for use in the design of single or multiple loop control systems for plants with delays.

While the present invention has been described with reference to an illustrative embodiment thereof, one skilled in the art will appreciate that there are changes in form and detail that may be made without departing from the intended scope of the present invention as defined in the pending claims. For example, the GLTI model representations are well suited for use in other technical computing environments such as XMATH, Mathematical, SCILAB, and Octave.

What is claimed is:

1. An electronic device for use in practicing a technical computing environment, the technical computing environment for developing and performing engineering and scientific related functions, the electronic device comprising, an input device for use by a user;

a modeling tool responsive to inputs from the user for:

creating a model of a linear time invariant system with a delay, the modeling tool:

modeling the linear time invariant system with the delay as a system including a feedback interconnection of a linear time invariant system without delay and a collection of one or more delays, and modeling the system including the feedback interconnection of the linear time invariant system without delay and the collection of one or more delays as a plurality of state-space equations, at least one of the plurality of state-space equations including at least one operator representing the delay, the model including a transfer function;

representing the transfer function as a function of a delay-free matrix and a matrix of delay elements representing the collection of one or more delays;

a processor for calculating a response of the model by evaluating the delay-free matrix and the matrix of delay elements separately; and one or more storage devices to store the response and the model of the linear time invariant system with the delay.

2. The electronic device of claim 1, further comprising a display device for viewing by a user, wherein the technical computing environment is capable of rendering a user interface on the display device to allow the user to provide the modeling tool with the inputs using the input device.

3. The electronic device of claim 1, wherein the modeling tool models a delay in a feedback loop of the linear time invariant system with the plurality of state-space equations.

4. An electronic device for use in practicing a technical computing environment, the technical computing environment for developing and performing engineering and scientific related functions, the electronic device comprising, an input device for use by a user;

a modeling tool responsive to inputs from the user for analyzing a linear time invariant system with a delay, the modeling tool representing the linear time invariant system with the delay as a system including a feedback interconnection of a linear time invariant system without delay and a collection of one or more delays, the modeling tool determining at least one response of a state-based model representing the system including the feedback interconnection of the linear time invariant system without delay and the collection of one or more delays to analyze the linear time invariant system with the delay, the at least one response calculated using a transfer function comprising a delay-free matrix and a matrix of delay elements representing the collection of one or more delays; and one or more storage devices to store the at least one response of the state-based model representing the linear time invariant system with the delay.

5. The electronic device of claim 4, wherein the modeling tool represents the linear time invariant system with delay as a state based model having a delay operator.

6. The electronic device of claim 4, wherein the modeling tool determines a frequency domain response of the state based model.

7. The electronic device of claim 4, wherein the modeling tool determines a time domain response of the state based model.

* * * * *